United States Patent [19]

Emmons

[11] Patent Number: 4,862,101
[45] Date of Patent: Aug. 29, 1989

[54] SYSTEM FOR PRODUCING SPECTRALLY PURE OPTICAL PUMPING LIGHT

[75] Inventor: Donald A. Emmons, Carlisle, Mass.

[73] Assignee: Frequency and Time Systems, Inc., Beverly, Mass.

[21] Appl. No.: 34,669

[22] Filed: Apr. 6, 1987

[51] Int. Cl.⁴ ............................ G02B 5/20; G02B 5/24
[52] U.S. Cl. ...................................... 330/4.3; 350/312
[58] Field of Search .................. 330/4.3; 350/312; 356/315–318; 307/425; 362/318

[56] References Cited

U.S. PATENT DOCUMENTS 3,986,769 10/1976 Senitzky .............................. 350/312
4,292,526 9/1981 Marling ............................... 350/312

OTHER PUBLICATIONS

Yabuzaki et al, "Frequency-locking of . . . Faraday Filter", 8/77, Opt. Comm., vol. 22, #2, pp. 181–184.
Yabuzaki et al, "Polarization Properties . . . Faraday Filter", 5/77; Jrn. J. Appl. Phys., vol. 16, #5, pp. 849–850, abst. only.

*Primary Examiner*—Nelson Moskowitz
*Attorney, Agent, or Firm*—Peter L. Berger

[57] ABSTRACT

A system for producing spectrally pure optical pumping light at a resonant frequency is disclosed for molecular species and atomic isotopes. A Faraday filter is used as a transmission filter, and the frequency overlap between the output of a light source containing the atomic or molecular material and the spectrum of the Faraday filter allows optically pure pumping light to emanate from the filter. Cross-polarizers are used to further reduce background noise.

28 Claims, 2 Drawing Sheets (D1 LINES OF RUBIDIUM, FOR ILLUSTRATION)

FIG. 4a  LAMP EMMISSION (e.g. Rb 85)            || ||

FIG. 4b  FILTER TRANSMISSION (e.g. Rb 87)     ||        ||

FIG. 4c  TRANSMITTED LIGHT                                |

FIG. 4d  RESONANCE CELL ABSORPTION (Rb 87)    |

FIG. 4e  DETECTOR SIGNAL (NO MICROWAVES; OR, OFF RESONANCE)    |

FIG. 4f  MICROWAVE RESONANCE                               |

SYSTEM FOR PRODUCING SPECTRALLY PURE OPTICAL PUMPING LIGHT

BACKGROUND OF THE INVENTION

This invention relates to an isotope filter device for optical pumping and finds application in frequency control and spectroscopic devices.

Optical pumping schemes for producing monochromatic pumping light (other than laser systems, which require elaborate frequency stabilization) suffer from low efficiency because the desired optical pumping frequency is one component of a plurality of hyperfine components with the plurality forming a background light signal which tends to mask the pumping light. The signal to noise ratio is very low, and the desired optical pumping light is greatly masked.

Prior art frequency control devices using such optical pumping include Rubidium frequency standards. These generally use some form of lamp and filter for optical pumping, and the optical pumping signal at the resonance frequency is limited to one or two percent due to background light.

Figure 3:
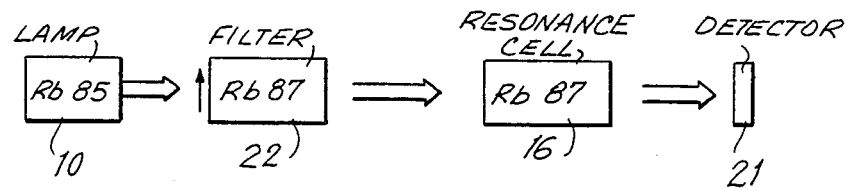

An example of a prior art rubidium frequency standard is illustrated in the article *Time Frequency and Physical Measurement* by Hellwig, Evenson and Wineland appearing in the December, 1978 issue of *Physics Today*. FIG. 3 of that article illustrates the Rubidium atomic reasonator. That diagram is substantially reproduced in FIG. 1 of this patent application and shows a Rb lamp 10 excited by a rf lamp exciter 12 to product light which is supplied to a filter cell 14 carrying Rb85 and a buffer gas. The light emanating from lamp 10 filtered by filter cell 14 passes into a resonance cell assembly 16 formed by an absorption filter which comprises an absorption cell 18 containing Rb87 and a buffer gas placed in a cavity 20 which also is provided with a weak magnetic field, the C-field. The cavity, absorption cell and filter are magnetically shielded and the resulting resonance signal is observed at detector 22.

Figure 1:
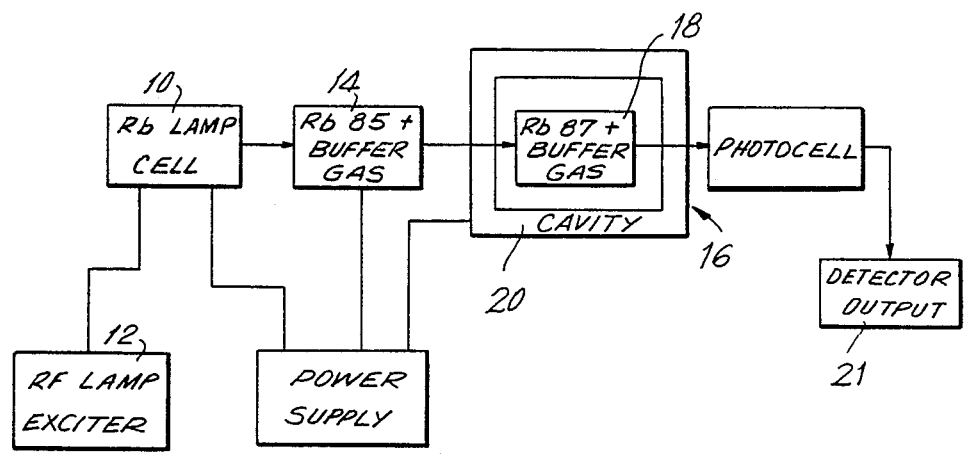

In operation, the apparatus of FIG. 1 utilizes a spectrum overlap between the emission lines of the Rb87 lamp and the absorpiton lines of the Rb85 filter cell 14 to produce an asymmetric transmitted spectrum capable of optical pumping in the resonance absorption cell 18. This light passes through the resonance cell 18 where it is preferentially absorbed by one of the ground states in the Rb87 atom. The result of this optical pumping is an imbalance in populations in steady state which is shown as a partial bleaching of the absorption coefficient in the resonance cell atoms providing enhanced transmission of light. When a microwave signal at the resonance frequency interrogates the cell, this bleaching action is interrupted because ground state populations are equalized by the resonant microwave field. The resulting optical signal (which is then used to control the microwave frequency) is typically only one or two percent of the total light signal. This is because although only one of the hyperfine components is needed for the depletion pumping of the ground state atoms in the resonance cell, all of the hyperfine components impinge on the detector to produce a large background signal which dilutes the resonance signal.

OBJECTIVES AND DESCRIPTION OF THE INVENTION

An object of the present invention is to provide an improved optical pumping spectrum such that the amplitude of the resonance signal is greatly increased, thereby increasing the signal-to-noise ratio in practical devices.

Another object is to provide such a high efficiency optical pump in an economic fashion while retaining the inherent simplicity and optical wavelength stability of atom lamps.

Another object of this invention is to provide such an improved optical pump which has other improved features such as reducing the light shift and achieving improved spectral purity without interference filters.

Other advantages, features and benefits of this invention will become more apparent as this invention is explained and illustrated.

The above objects of this invention are achieved by utilizing a transmission filter instead of an absorption filter to produce the resonant optical pumping signal. This is achieved with a Faraday filter utilizing atomic isotopes having a spectral overlap which is exploited to provide a resulting optical pumping signal with the above-stated improvements.

Faraday filters are well known prior art devices and have been used for frequency locking a laser as discussed in *Frequency-Locking of Organic Dye Lasers to Atomic Resonance Lines* by Sorokin, Lankard, Moruzzi and Lurio which appeared in the Volume 15, Number 6 September 15, 1969 issue of Applied Physics Letters. Additionally, a Faraday effect filter is discussed in *Dispersion in the Vicinity of an Optical Resonance* by Fork and Bradley appearing in Vol. 3 No. 1 of Applied Optics, the January 1964 issue.

The Faraday filter depends on the birefingence property of atoms in a magnetic field. Each hyperfine component exhibits Zeeman splitting. Light travels parallel to the magnetic field of the Faraday filter, and left circularly polarized light is absorbed on one side of the unsplit line center while right circularly polarized light is absorbed on the other side. Light transmission occurs at line center for linearly polarized light, whose plane of polarization is then rotated through an angle dependent upon the magnetic field strength and gas density of the Faraday filter. Crossed polarizers prevent all light except that at line center from being transmitted.

The present invention recognized that the Faraday effect may be advantageously employed with atomic isotopes of molecules having a spectral overlap with a particular component of a light source spectrum. The Faraday filter operates as a transmission filter tuned specifically to the overlapped component. The Faraday filter used with crossed linear polarizers operates to block substantially all light components except those at or near the resonance line windows of the Faraday filter. The resultant transmitted light has a high degree of spectral purity and is many times more efficient for optical pumping than the prior art system and takes advantage of the inherent simplicity and optical wavelength stability of atomic lamps.

Figure 2:
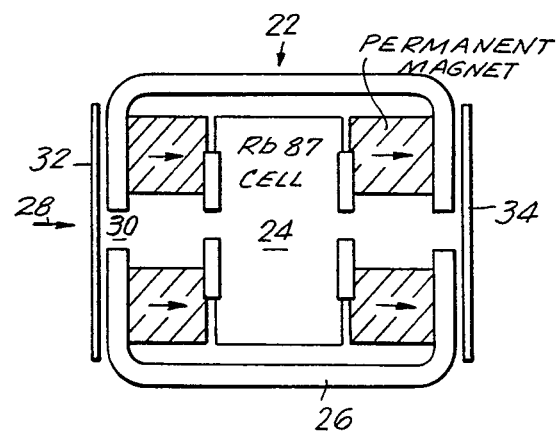

FIG. 2 illustrates the Faraday effect filter used with this invention. The filter of FIG. 2 is substituted for the absortion filter in the system of FIG. 1. The transmission filter characteristics of the Faraday filter find special application in overlapping isotopic signals and will be further explained below.

The Faraday filter 22 of FIG. 2 comprises a cell 24 in a thermally stabilized enclosure at a desired cell temperature including a Rb isotope for example which is surrounded by a high-permeability yoke and magnetic shield 26. A light beam 28 passes through an entry area 30 and interacts with the Faraday filter. Crossed polarizers comprising an entrance polarizer 32 and an exit polarizer 34 preferably with its axis rotated 90 degrees from the entrance polarizer, block all background light and other components except the desired component of transmitted light. The invention recognizes that with atomic isotopes having overlapping components, a Faraday filter may be employed holding one of those isotopes, and the effect of the Faraday filter as a transmission filter rather than an absorpiton filter as found in the prior art. In this system the Faraday filter is employed as a transmission filter where atomic isotopes are provided which have overlapping components to enhance the spectral purity of transmitted light.

This invention provides a system for providing a pure pumping light source by utilization of the transmission filter (Faraday filter) in combination with the light source. The use of an optical pumping light may be with molecular as well as atomic species so long as an overlap of transmission and absorption lines exist.

Various light sources may be utilized. These can include pulse light (including lasers) as well as continuous light.

FIG. 3 illustrates one use of the pure optical pumping light achieved with the invention. An Rb lamp 10 containing Rb85 which produces incident light directed at the Faraday filter 22 containing Rb87 (with or without a buffer gas). The hyperfine output component transmitted by Faraday filter 22 is then directed to the resonance cell 16 containing Rb87 (also with or without a buffer gas) and the output of the resonance cell Rb impinges upon detector 22.

In this system the Faraday filter cell also uses an isotope with spectral overlap, but rather than absorbing at a specific hyperfine line, it transmits this line. It can only transmit incident light which falls within one of its narrow-line windows. It transmits a hyperfine line which is used by the resonance cell and is detected at 22 without interference from other components.

When the Faraday filter 22 utilizes Rb85 and the resonance cell 16 to be pumped utilizes Rb87 (or vice versa), then the light source 10 may be very broadband in wavelength. It may even be white light. This includes pulsed lasers (e.g. diode laser) which is not frequency stable but sweeps through the frequency of interest during the pulse. One advantage of such a system is that the source does not have to be an alkali metal discharge lamp of the present practice. These discharge lamps have limited lifetime bacause lamp plasma is hot, and the alkali metal atoms (e.g. Rb or Cs) migrate into the walls of the lamp and the lamp no longer emits the strong spectral lines which are needed. An alternative lamp source can be a long-lived bright discharge using only noble gas.

An alternative utilization of the principles of this invention relates to its use with masers. The Faraday transmission filter may be utilized with molecular species in which there is an overlap of molecular transmission and absorption lines. This will allow spectrally pure light for optical pumping in appropriate molecular gases, particularly for use with masers.

FIGS. 4a-4f below are a series of figures illustrating the light spectrum produced at various locations in the system of FIG. 3. It should be recognized throughout the description of lamp and transmission filter, that the roles of Rb85 and Rb87 may be interchanged with the result that pure pumping light for the Rb87 resonance cell is produced in either case.

FIG. 4a lamp emmission (e.g. Rb85),
FIG. 4b filter transmission (e.g. Rb87),
FIG. 4c transmitted light,
FIG. 4d resonance cell absorption (Rb87),
FIG. 4e Detector signal (no microwaves; or, off resonance),
FIG. 4f microwave resonance, FIG. 4a illustrates emission by lamp 10 of four hyperfine components of the D1 line comples at 794.7 nm wavelength. A similar situation exists for the D2 (780 nm) line complex and in practice both D1 and D2 light can contribute to the spectrally pure pumping light.

Faraday filter 22 with its Rb87 isotope has several windows or hyperfine components as shown in FIG. 4b, and the fourth one of those hyperfine components overlaps with the third hyperfine component of the lamp 10 with its Rb85 isotope. The transmission characteristics of and tuning of the Faraday filter may be accomplished by controlling the oven temperature and thus the gas density and/or the magnetic field strength in the region of the cell within shield 26.

The transmitted light emanating from Faraday filter 22 is illustrated in FIG. 4c and the Rb87 resonance cell 16 absorption with its Rb87 is illustrated in FIG. 4d. It is this absorption process which represents optical pumping. FIG. 4e illustrates the detector signal at 22, when optical pumping has partially bleached the absorption transition. The effect of the microwave resonance signal is shown in FIG. 4b where the solid line represents microwaves off and the dotted line represents the microwave resonance signal. This signal is on the order of 20 times the effect seen for conventional absorption cell filtering.

With regard to FIGS. 4a-4f, all hyperfine components except the third represent backround light which reduces the attainable signal-to-noise performance of conventional Rb cell frequency standards.

The transmission filter cell 22 may alternatively contain the Rb85 isotope, in which case the lamp will contain Rb8. The light-shift induced microwave resonance frequency shift will depend on which isotope is chosen since the pumping light symmetry will depend on exact details of the transmission function.

Yet another embodiment of the Rubidium system may have the resonance cell 16 wall coated with no buffer gas, and no buffer gas will be used in the Faraday filter.

Use of the Faraday filter composed of the same isotope which is used for resonance eliminates the large backround light arising from the lamp cell 10 spectrum. Although intensity asymmetry exists because of the lack of perfect overlap between the source 14 and transmission (Faraday 22) filters, the great advantage of this system as being nearly background-free is maintained.

The spectrally pure pumping light produced as described may also be used for optical pumping in a Rb85 resonance cell (as well as for Rb87) since the correct overlap conditions exist.

This invention has been illustrated in the above preferred embodiments. This invention as protected by the claims may be utilized by adapting it to other environments and in the other embodiments within the skill of those in the art.

What is claimed is:

1. A system for producing pumping light of the hyperfine double resonance type at a specific resonant frequency of an atomic isotope, said system comprising:
a lamp source containing a first atomic isotope, said first isotope having a plurality of hyperfine components, said lamp source producing incident light,
a transmission filter comprising a second atomic isotope having a plurality of hyperfine components with one of the hyperfine components of said second atomic isotope overlapping one of the hyperfine components of the first atomic isotope, the overlapped hyperfine components being substantially the reasonant frequency of the pumping light to produce hyperfine level population imbalance at substantially ground state in a radio frequency resonance cell.

2. The system as set forth in claim 1, further comprising a radio frequency resonance cell also containing an atomic isotope, said resonance cell receiving the outputs of said transmission filter to utilize said resonant pumping light.

3. A system as set forth in claim 2, wherein the atomic isotope of said resonance cell is the same as that of the first atomic isotope.

4. A system as set forth in claim 2, wherein the atomic isotope of said resonance cell is the same as that of said second atomic isotope.

5. A system as set forth in claim 1, wherein the characteristics and frequencies of said transmission filter are adjustable.

6. A system as set forth in claim 5, wherein the transmission filter comprises an oven whose temperature is controllable to adjust the density of the atomic isotopic gas therein.

7. A system as set forth in claim 5, wherein said transmission filter comprises a magnetic field wherein the strength of said magnetic field is adjustable.

8. A system as set forth in claim 1, wherein said transmission filter is a Faraday filter.

9. A system as set forth in claim 1, wherein said transmission filter comprises crossed-polarizers, one at the entrance and one at the exit thereof.

10. A system as set forth in claim 9, wherein the axes of said crossed-polarizers are rotated 90 degrees with respect to each other.

11. A system as set forth in claim 2, wherein the first isotope is Rubidium 85 and the second isotope is Rubidium 87.

12. A system as set forth in claim 2, wherein said lamp source further comprises a buffer gas to operate on said first isotope and said resonance cell also comprises a buffer gas to operate on the isotope therein.

13. A system as set forth in claim 2, wherein said source of light is broadband in wavelength.

14. The system as set forth in claim 1 wherein two manifolds of hyperfine lines are produced such that in both there is an overlap to permit useful transmission of pumping light, wherein at least two filtered components may be employed in optical pumping.

15. A system as set forth in claim 14, wherein said transmission filter is a Faraday filter specifically tuned to one of said hyperfine lines.

16. A system for producing pumping light of the hyperfine double resonance type at a specific resonant frequency of a molecular species, said system comprising:
a lamp source containing a first molecular specie, said first molecular specie having a plurality of molecular transitions, said lamp source producing incident light at said resonant frequency,
a transition filter comprising a second molecular specie having a pluality of absorption lines with one of the absorption lines of said second molecular specie overlapping one of the molecular transitions of the first molecular specie, the overlapped hyperfine components being at substantially the resonant frequency of the pumping light to produce hyperfine level population imbalance at substantially ground state in a radio frequency resonance cell.

17. The system as set forth in claim 16, further comprising radio frequency a resonance cell also containing a further molecular specie, said resonance cell receiving the outputs of said transmission filter to utilize said resonant pumping light.

18. A system as set forth in claim 17, wherein the molecular specie of said resonance cell is the same as that of the first molecular specie.

19. A system as set forth in claim 17, wherein the molecular specie of said resonance cell is the same as that of said second molecular specie.

20. A system as set forth in claim 17, wherein the characteristics and frequencies of said transmission filter are adjustable.

21. A system as set forth in claim 16, wherein said transmission filter is a Faraday filter.

22. A system as set forth in claim 16, wherein said transmission filter comprises crossed-polarizers, one at the entrance and one at the exit thereof.

23. A system as set forth in claim 22, wherein the axes of said crossed-polarizers are rotated 90 degrees with respect to each other.

24. The system as set forth in claim 16, wherein two manifolds of hyperfine lines are produced such that in both there is an overlap to permit useful transmission of pumping light, wherein at least two filtered components may be employed in optical pumping.

25. A high efficiency filter to provide spectrally pure pumping light of the hyperfine double resonance type, said filter comprising a lamp source, the output thereof impinging upon a Faraday filter serving as a transmission filter to produce said spectrally pure optical pumping light producing hyperfine level population imbalance at substantially ground state for a radio frequency resonance cell.

26. The system as set forth in claim 25, wherein the radio frequency energy is in the microwave frequency range.

27. The system as set forth in claim 1, wherein the radio frequency energy is in the microwave frequency range.

28. The system as set forth in claim 16, wherein the radio frequency energy is in the microwave frequency range.

* * * * *